Sept. 30, 1952      A. G. JANOS      2,612,351
ARRANGEMENT FOR MOUNTING HEAT TRANSFER CONDUITS
Filed Nov. 21, 1946
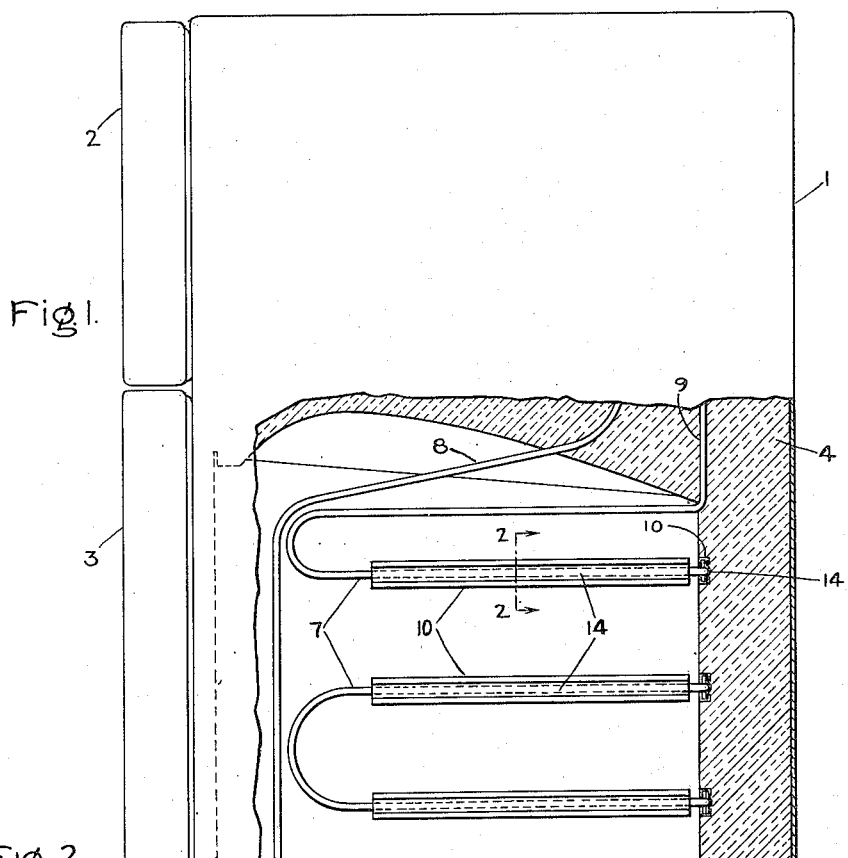
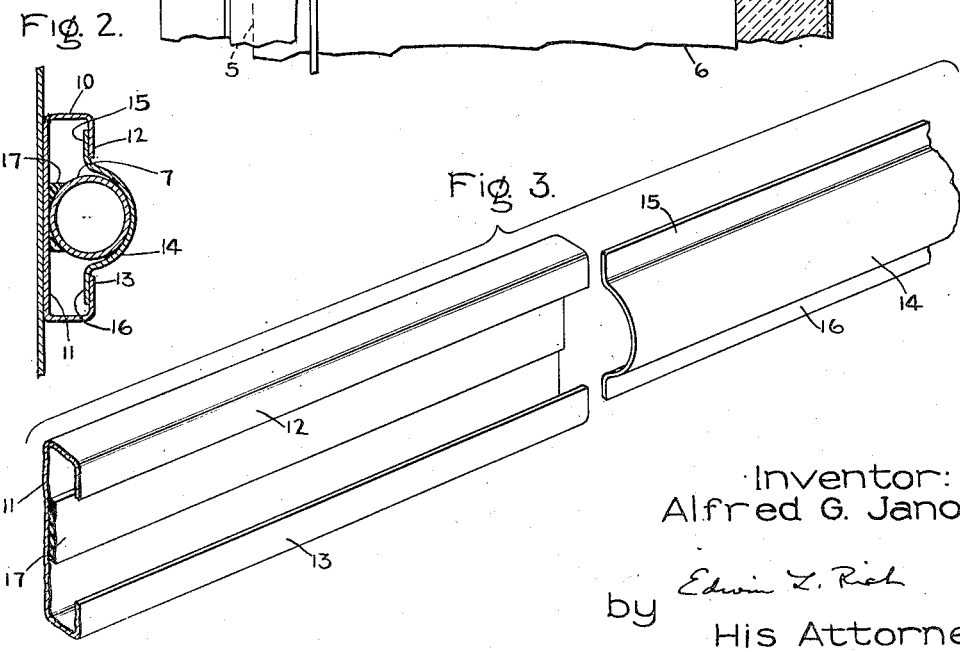
Inventor:
Alfred G. Janos,
by Edwin L. Rich
His Attorney.

Patented Sept. 30, 1952

2,612,351

UNITED STATES PATENT OFFICE 2,612,351

ARRANGEMENT FOR MOUNTING HEAT TRANSFER CONDUITS

Alfred G. Janos, Erie, Pa., assignor to General Electric Company, a corporation of New York Application November 21, 1946, Serial No. 711,291

4 Claims. (Cl. 257—256)

My invention relates to heat exchangers and more particularly to an arrangement for removably mounting a conduit in heat exchange relation with a surface whose temperature is to be affected thereby.

It is sometimes desirable that a conduit be mounted on a surface with which it is to be in heat exchange relationship in such a manner that the conduit may be easily removed when necessary. However, the provision for removably mounting the conduit makes it difficult to secure a satisfactory heat exchange relationship, because of the possibility of poorer contact between the various parts than can be obtained by permanent mounting. It is an object of this invention to provide an arrangement for mounting a conduit on a surface the temperature of which is to be affected, which arrangement both provides for easy assembly and disassembly and also maintains the conduit and the surface in intimate heat exchange relationship.

It is another object of this invention to provide a plurality of paths for heat flow between a heat exchange conduit and a heat conducting surface on which it is mounted in order to increase the rate of heat transfer.

It is another object of this invention to provide a large surface of contact between a heat exchange conduit and heat conducting elements used for mounting the conduit on a surface the temperature of which is to be affected, whereby heat transfer between the surface and the conduit will be facilitated.

Further objects and advantages of this invention will become apparent as the following description proceeds and the features of novelty which characterize this invention will be pointed out in particularity in the claims annexed to and forming a part of this specification.

For a better understanding of my invention, references may be had to the accompanying drawing showing one application of my invention in which Fig. 1 is a view of a portion of the refrigerator cabinet partly broken away showing an arrangement for mounting a conduit; Fig. 2 is a sectional view taken along the line 2—2 of Fig. 1; and Fig. 3 is an exploded view showing the separate elements for mounting the conduit.

By the way of illustration I have shown in the drawing a specific embodiment of my invention applied to a household refrigerator. In order to cool a food storage compartment of such a refrigerator, the expedient is sometimes used of providing an evaporator in the form of a refrigerant-conducting conduit and of mounting the conduit on the outside of a wall forming the compartment. Referring to Figs. 1 and 2 there is shown a refrigerator cabinet 1, which is provided with a door 2 for a freezing compartment (not shown) and a door 3 for a cooling compartment. Suitable insulation 4 is provided for the refrigerator cabinet. Within the cabinet there is shown a portion of a food storage compartment 5 for the storage of food.

The food storage compartment is formed by a heat-conducting metal wall or surface 6. This wall 6 is cooled, and the compartment 5 is thereby refrigerated, by an evaporator which is mounted on the outside of the wall. In the embodiment shown in this figure, an evaporator in the form of several turns of conduit or tubing 7 is provided, and the tubing is maintained in heat exchange relationship with the metal wall 6 along the back and two sides of the food storage compartment. Liquid refrigerant is supplied to the evaporator tubing 7 through a conduit 8, and the vaporized refrigerant is withdrawn from the evaporator through a conduit 9. The conduits 8 and 9 may be connected to any suitable refrigerant condensing apparatus.

In order to connect the evaporator tubing 7 in intimate heat exchange relationship with metal wall 6 and to provide for easy assembly and disassembly of this tubing, a plurality of metal heat-conducting channels or members 10 of C-shaped cross-section are provided. These channels are fixed securely to the wall 6 of the compartment 5 in any suitable manner, as by welding, and they are arranged along the back and two sides of the compartment. The entire surface of the base 11 of each channel 10 is maintained in heat exchange relationship with the wall 6 in order to provide a large area for heat transfer between the wall and the channel. Each channel is provided with inwardly extending flanges 12 and 13. The longitudinal opening in the channel between these flanges is larger than the diameter of the evaporator tubing so that the tubing may readily be inserted into the channel through this opening.

In order to press the evaporator tubing into heat exchange relationship with the base 11 of the channel and thereby to provide for heat transfer from the wall 6 to the tubing, there is provided a strip or member 14 of heat-conducting material, such as metal, which is adapted to engage the channel 10 beneath the flanges 12 and 13. The strip 14 is provided with outwardly extending portions 15 and 16 which engage the flanges 12 and 13 respectively. The remainder of the strip is shaped to the general contour of the tubing 7 so that there will be a large surface of the tubing in heat exchange relationship with the strip, and the strip is urged into heat exchange contact with the tubing 7 by the natural resilience of the strip. In order to further facilitate heat transfer between the wall 6 and the tubing 7 there is provided a layer of deformable heat-conducting material 17, such, for example, as a non-hardening, non-oxidizing grease impregnated with aluminum powder, sold under the trade name "Permagum." As the tubing 7 is forced against the base of the channel by the strip 14 the tubing is pressed into the deformable material 17 and this material spreads about a large area of the tubing and thereby increases the heat transfer surface.

It can be seen that there are provided two paths for the transfer of heat from the wall 6 of the food storage compartment to the evaporator tubing 7. One of these paths extends from the wall 6 through the base 11 of the channel 10 and thence through the heat-conducting material 17 to the large area of the tubing embraced by this heat-conducting material. The other heat transfer path leads from the wall 6 through the sides of the channel 10, the flanges 12 and 13 and the strip 14 to the evaporator tubing 7. As mentioned previously, the contour of the strip 14 is such that there is a large surface of contact between the strip 14 and the tubing 7. Thus, by this arrangement, a plurality of heat transfer paths are provided and a large proportion of the surface of the evaporator tubing is maintained in heat transfer relation with one or the other of these paths.

In Fig. 3 the elements which comprise the mounting assembly for the evaporator tubing are shown prior to assembly of the evaporator tubing. A flat layer of deformable heat-conducting material 17 has been applied to the base 11 of the channel 10. In the assembly of the evaporator tubing on the wall 6 of the food storage compartment, the tubing 7 is readily inserted through the opening in the channel 10 between the flanges 12 and 13. The strip 14 is then inserted over the evaporator tubing at one end of the channel, and the portions 15 and 16 of the strip 14 are engaged beneath the flanges 12 and 13. The strip is then slid along substantially the entire length of the channel 10 and, as this sliding proceeds, the tubing 7 is forced toward the base 11 of the channel and is thereby pressed firmly into the deformable heat-conducting material 17. By this assembling operation the curved portion of strip 14 is resiliently urged into heat exchange contact with a substantial area of the tubing 7. This method of assembling will, of course, be repeated for each of the horizontal portions of the evaporator tubing included in the complete evaporator assembly.

When it is necessary to disassemble the evaporator tubing from the wall of the cooling compartment, this can be easily accomplished by sliding each of the strips 14 out the end of its corresponding channel 10. The evaporator tubing 7 will then be exposed and may be readily lifted from the channel through the opening between the flanges 12 and 13.

While, for purposes of illustration, my invention has been shown and described in connection with the cooling compartment of a household refrigerator, it will be apparent that its application is not so limited and that the invention is applicable to any apparatus in which it is desired to mount a conduit of a surface whose temperature is to be affected by fluid flowing through said conduit. It is intended, therefore, in the appended claims to cover all modifications which come within the spirit and scope of this invention.

What I claim as new and desire to secure by Letters Patent of the United States is:

1. In a heat transfer apparatus, means including a heat-conducting wall providing a compartment the temperature of which is to be affected, a heat-conducting member of C-shaped cross section fixed to said wall, a length of conduit for conducting heat transfer fluid adapted to be inserted through the opening in said C-shaped member, and a heat-conducting strip curved to fit the contour of said conduit adapted to be slid into assembled relationship with said C-shaped member for pressing said conduit against said C-shaped member to provide one heat transfer path between said wall and said conduit, the curved portion of said strip being resiliently urged into heat exchange relationship with said conduit to provide a second heat transfer path between said wall and said conduit, said conduit being enclosed throughout its length between said C-shaped member and said strip.

2. In a heat transfer apparatus, means including a heat-conducting wall providing a compartment the temperature of which is to be affected, a length of conduit for conducting heat transfer fluid to affect the temperature of said compartment, and means enclosing said conduit throughout its length for removably mounting said conduit in intimate heat exchange relationship with said wall, said last-named means including an elongated heat-conducting member of C-shaped cross-section fixed to said wall to provide one heat transfer path between said conduit and said wall and a removable strip of heat-conducting material arranged in slidable engagement with said C-shaped member, said strip being shaped to fit the contour of said conduit over a substantial surface thereof to provide a second heat transfer path between said conduit and said wall.

3. In a heat transfer apparatus, means including a heat conducting wall providing a compartment the temperature of which is to be affected, a conduit for conducting heat transfer fluid to affect the temperature of said compartment, means for removably mounting said conduit on said heat conducting wall in intimate heat exchange relationship therewith, said means comprising a channel of heat-conducting metallic material having a base fixed to said wall and having a longitudinal opening through which said conduit may be inserted, said channel providing one conductive heat transfer path between said conduit and said wall, and a removable member of heat-conducting metallic material arranged in sliding relationship to said channel for closing said longitudinal opening of said channel and for pressing said conduit in heat exchange relationship with the base of said channel, said removable member providing a second conductive heat transfer path between said conduit and said wall.

4. In a heat transfer apparatus, means including a heat-conducting wall providing a compartment the temperature of which is to be affected, a length of conduit for conducting heat transfer fluid to affect the temperature of said compartment, means for removably mounting said conduit on said heat-conducting wall in intimate heat exchange relationship therewith, said means including a heat-conducting metallic channel fixed to said wall and providing one conductive heat transfer path between said conduit and said wall, said conduit being receivable within said channel, said channel being provided with flanges, and a heat-conducting metallic member adapted to engage said flanges for pressing said conduit firmly against said channel, said conduit being enclosed throughout its length between said channel and said member, said member providing a second conductive heat transfer path between said conduit and said wall and being arranged in slidable relation with said flanges of said channel whereby said member may be slid out of engagement with said channel to permit removal of said conduit.

ALFRED G. JANOS.

REFERENCES CITED

The following references are of record in the file of this patent:

UNITED STATES PATENTS

| Number | Name | Date |
| --- | --- | --- |
| 440,671 | Weisel | Nov. 17, 1890 |
| 686,419 | Page | Nov. 12, 1901 |
| 1,189,208 | Hodkinson | June 27, 1916 |
| 2,059,766 | Barker | Nov. 3, 1936 |
| 2,446,895 | Weiss | Aug. 10, 1948 |
| 2,457,009 | Tanner | Dec. 21, 1948 |

FOREIGN PATENTS

| Number | Country | Date |
| --- | --- | --- |
| 399,995 | Great Britain | Oct. 19, 1933 |
| 403,899 | Great Britain | Jan. 4, 1934 |